United States Patent [19]

Kondo

[11] Patent Number: 4,530,458
[45] Date of Patent: Jul. 23, 1985

[54] SOLDERING APPARATUS
[75] Inventor: Kenshi Kondo, Tokyo, Japan
[73] Assignee: Nihon Den-Netsu Keiki Co., Ltd, Japan
[21] Appl. No.: 561,981
[22] Filed: Dec. 16, 1983
[30] Foreign Application Priority Data Dec. 17, 1982 [JP] Japan ............................ 57-220189
Dec. 17, 1982 [JP] Japan ............................ 57-220190
Jan. 18, 1983 [JP] Japan .............................. 58-5282
Feb. 22, 1983 [JP] Japan ............................ 58-27077

[51] Int. Cl.³ .......................... B23K 1/08; B23K 3/06
[52] U.S. Cl. .................................. 228/180.1; 228/37; 228/43
[58] Field of Search ............... 228/20, 22, 37, 43, 228/57, 56 A, 125, 180 R, 262; 118/410, 413, 74

[56] References Cited

U.S. PATENT DOCUMENTS

4,101,066 7/1978 Corsaro ............................ 228/180 R
4,171,761 10/1979 Boldt et al. ....................... 228/180 R
4,208,002 6/1980 Comerford ............................ 228/37
4,465,219 8/1984 Kondo ................................... 228/37

Primary Examiner—Nicholas P. Godici
Assistant Examiner—C. McKee
Attorney, Agent, or Firm—Stephen F. K. Yee

[57] ABSTRACT

Printed circuit boards bearing chip type electric parts on its underside surface and travelling along a predetermined path are soldered by contact with a progressive wave of a molten solder progressing in a direction transverse to the path of travel of the printed circuit board. A nozzle member provided with an array of molten solder overflowing ports arranged in a direction transverse to the travelling path is moveable in the same direction so as to form the progressive wave of molten solder.

18 Claims, 21 Drawing Figures

SOLDERING APPARATUS

BACKGROUND OF THE INVENTION

This invention relates to an apparatus for soldering printed circuit boards.

To reply to recent demands for compact electrical appliances and instruments, there is a tendency of using small thin chip type electric parts for mounting on the printed circuit boards in place of the conventional discrete type electric parts. From the viewpoint of the parts mounting operation, the chip type parts also excel the discrete type parts in that the former can be fixed on a board by face bonding and can be mounted in positions automatically in a facilitated manner and at a lower cost whereas the latter parts are difficult to insert into through holes of the printed circuit boards by automatic operation and involves an increased number of steps, for example, a step for cutting lead wires depending from the underside surface of the board.

Although there have thus far been proposed various soldering apparatus for printed circuit boards, they invariably give rise to problems of soldering failures when applied to printed circuit boards bearing the chip type parts due to the recesses defined between adjacent chip type parts or behind the chip type parts as seen in the direction of travel of the boards. Such recesses or space can block the molten solder from flowing thereinto and can trap gases therein, causing incomplete deposition of the solder. The air bubbles once trapped in the recesses are difficult to remove even if the printed circuit board is contacted with the molten solder for a long period of time.

SUMMARY OF THE INVENTION

With the foregoing situations in view, the present invention has as its object the provision of an apparatus for soldering printed circuit boards, which is devoid of the drawbacks involved in the conventional apparatus.

It is a more specific object of the present invention to provide a soldering apparatus for printed circuit boards, which is capable of providing steady and reliable joints between the electric parts and the circuit of the printed circuit board.

According to the present invention there is provided an improved apparatus for soldering printed circuit board moving along a predetermined path of travel, which comprises a vessel for containing a molten solder, an upwardly extending riser having its lower end in flow communication with the vessel, and feed means operable for supplying the molten solder within the vessel to overflow from the upper end of the riser with the underside surface of the printed circuit board being contacted with the overflowing molten solder. The improvement includes: the riser which is provided at its upper open end with a plurality of molten solder-overflow ports arranged transversely to the transfer path so that the molten solder overflowing therefrom may form a transversely oriented standing wave having a plurality of protruded surfaces over respective overflow ports. The overflow ports are moveable such that the standing wave may progress in a direction transverse to the transfer path, whereby the underside surface of the printed circuit board is contacted with the progressive wave of molten solder overflowing from the moving overflow ports.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DESCRIPTION OF THE PREFERRED EMBODIMENTS

Figure 1:
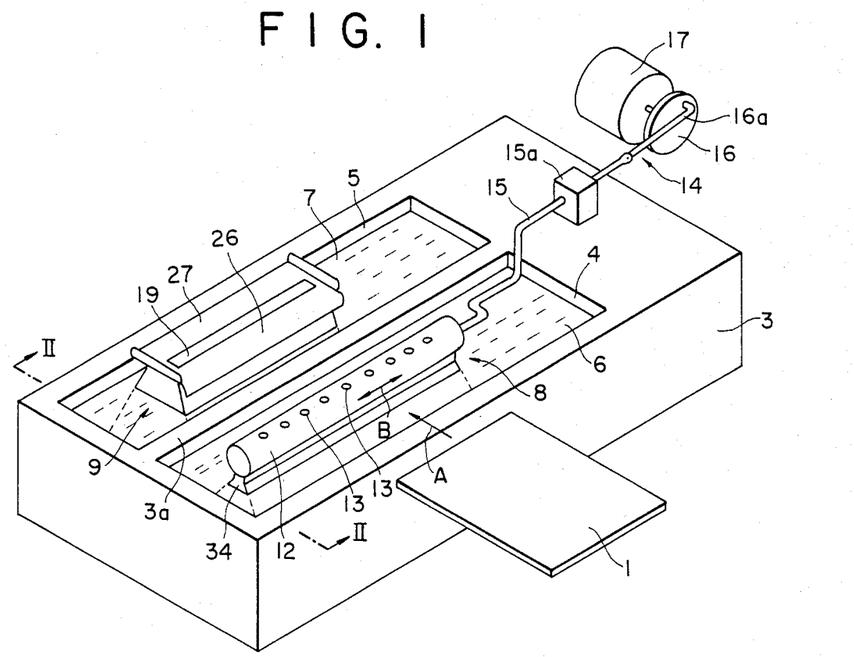
FIG. 1 is a perspective view diagrammatically showing one embodiment of the soldering apparatus according to the present invention.
Figure 2:
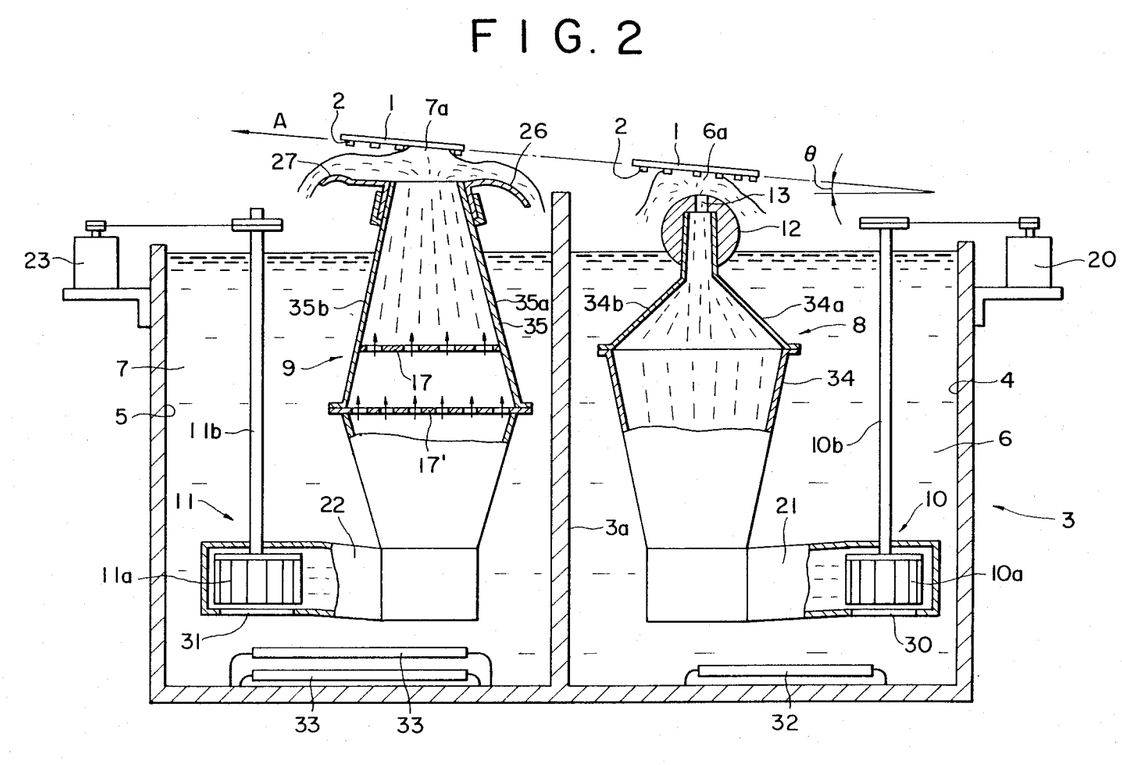
FIG. 2 is a cross-sectional view cut away in part and taken on line II—II of FIG. 1.

Referring to FIGS. 1 and 2, the reference numeral 3 denotes a pot which is generally rectangular in shape and which is open on the top side thereof. The pot 3 is divided by a partition wall 3a into separate first and second tanks 4 and 5 in a tandem fashion, i.e. in a direction parallel with the direction along which printed circuit boards 1 are successively travelled. The first and second tanks 4 and 5 contain molten solders or melts 6 and 7, respectively. The melts 6 and 7 are maintained at suitable temperatures by heating elements 32 and 33 such as electric resistance coils or the like. For example, the melt 6 in the first tank 4 is maintained at a temperature in the range of 235° to 240° C., while the melt 7 in the second tank 5 is maintained at a temperature range slightly higher than that of the melt 6, more specifically, in the range of 240° to 245° C. The melts 6 and 7 are respectively applied to printed circuit boards by first and second solder applicator means which are generally indicated by reference numerals 8 and 9.

Disposed within the first tank 4 is an upwardly extending riser 34, the lower end of which is connected to one end of a conduit 21. At the other end, the conduit 21 is provided with a molten solder supply hole 30 which is opened toward the bottom of the tank 4. Consequently, the lower portion of the riser 34 is in flow communication with the first tank 4. The riser 34 is formed in a substantially rectangular shape in section and has a sectional area gradually reduced from its middle portion toward its upper end. More specifically, of the two pairs of opposing side walls forming the riser 34, the side plates are disposed substantially in parallel with each other or slightly convergent inwardly while the front and rear plates 34a and 34b are converged towards the upper end of the riser 34.

A feed means 10 is provided in the tank 4 for continuously supplying the molten solder 6 in the first tank 4 to the riser 34. The feed means 10 preferably includes a propeller assembly 10a which is disposed within the conduit 21 adjacent to the opening 30. The propeller 10a is provided with a shaft 10b which is connected to a drive means including a motor 20 so that it is rotated about a shaft 10b upon actuation of the motor 20 to supply the molten solder 6 in the first tank 4 continuously to the riser 34 and overflows from its upper end to return to the first tank 4. The front and rear plates 34a and 34b of the riser 34 form between their upper ends a laterally extending slit on which is slidably mounted a cylindrical nozzle member 12 having a plurality of substantially equally spaced apart overflowing ports 13 which are arranged in a direction parallel with the axis of the nozzle member 12 and which are in fluid communication with the riser 34. The overflow ports 13 have substantially the same diameter with each other and preferably in the range of between 5 and 10 mm.

The molten solder which has been introduced into the riser 34 by the feed means 10 is, thus, forced to overflow from respective ports 13 to form over the nozzle member 12 a standing wave having a plurality of raised or protruded portions at position corresponding to the overflowing ports 13.

Drive means 14 is provided to reciprocally and slidably move the nozzle member 12 in the axial direction of the nozzle member 12, i.e. in a direction transverse to the transfer path of the printed circuit board 1, as shown by the arrow B, so that the molten solder overflowing from the reciprocally moving ports 13 can form a progressive wave 6a progressing in the same direction as the movement of the nozzle member 12. The drive means 14 of this embodiment includes a motor 17 whose drive axis is fixedly secured to a balance wheel 16. A crank shaft 15 is slidably received by a guide 15a provided on the pot 3 and has its one end connected to the nozzle member 12 and its the other end pivotally connected to a drive shaft 16a rotatably connected to the balance wheel 16. Upon rotation of the motor 17, the nozzle member 12 is reciprocally displaced. It is preferred that the nozzle member 12 displace in its every half cycle of the reciprocation through a distance substantially equal to an integer multiple of the distance between the adjacent two overflowing ports 13.

Referring continuedly to FIGS. 1 and 2, the printed circuit boards 1 each having chip type electric parts 2 temporarily attached to its lower side by means of an adhesive or the like are fed from right to left, as viewed in FIG. 2, or in the direction of the arrow A along the predetermined path of travel by operation of conventional transfer means. In this instance, it is preferred that the printed circuit board 1 travel in a rearwardly inclined posture and along a similarly inclined path of travel at an angle of $\theta$ with respect of the horizontal plane so that the molten solder excessively applied to the board can drop in a facilitated manner. As the printed circuit board 1 passes over the first solder applicator 8, its lower side is brought into contact with the progressive wave 6a of molten solder for soldering the parts on the underside of the printed circuit board 1. Since the upper surface of the solder wave 6a is continuously moved in a direction transverse to the direction of the travel of the printed circuit board 1, the molten solder can arrive at the recessed portions of the chip parts-bearing printed circuit board 1 in an accelerated manner without permitting gases to be trapped in those portions.

The printed circuit board 1 which has undergone the soldering treatment with the molten solder 6 in the first solder applicator 8 is then passed to the adjacently located second applicator 9 for contact with the second molten solder 7 which is generally maintained at a higher temperature than that of the first melt 6. The second solder applicator 9 may be arranged in the same manner as the above-described first applicator 8, if desired. However, it is preferred that the second applicator 9 be of the type which is adapted to overflow the molten solder to form a standing wave 7a running in front and rear directions as shown particularly in FIG. 2.

The second solder applicator 9 of FIGS. 1 and 2 is provided with an upwardly extending riser 35 disposed within the second tank 5. The lower end of the riser 35 is connected to one end of a conduit 22 and communicates directly with the second tank 5 through a solder feed port 31 which is opened toward the bottom of the second tank 5 at the other end of the conduit 22. The riser 35 is substantially rectangular in section and has a sectional area gradually reduced from its middle portion toward its upper end. More specifically, the riser 35 is constituted by a pair of substantially parallel side plates and a pair of upwardly converging side plates 35a and 35b forming a laterally extending opening 19.

The second applicator 9 is provided with a solder feeder 11 similar to the feeder 10 of the first applicator 8 and including a propeller 11a which is driven from a motor 23 to rotate about a shaft 11b for supplying the molten solder 7 in the tank 5 to the riser 35 through the opening 31. The front and rear plates 35a and 35b of the riser 35 are inclined substantially symmetrically as shown in the drawing and provided with guide members 26 and 27 at the respective upper ends. Thus, the molten solder 7 which is forced to flow upwardly through the riser 35 flows out from the upper end of the riser, forming a standing wave 7a of molten solder flowing two opposite sides with its transversely extending center portion being slightly protruded. The overflown solder returns to the tank 5. The lower side of the printed circuit board 1 is contacted with the center portion of the standing wave 7a to effect a second soldering treatment. The electric components 2 which have their respective rear portions sufficiently soldered in the soldering treatment of the first stage are completely connected to the circuits of the board 1 by the soldering treatment of the second stage both mechanically and electrically. Moreover, the first stage treatment can serve as a preheating step for the second soldering stage and, hence, the soldering treatment in the second stage can be performed effectively without exerting the thermal stress on the electric components on the board. Denoted at 17 and 17' are perforated plates for controlling uniform upward flows of the molten solder 7 through the riser 35 across the width thereof.

Figure 3:
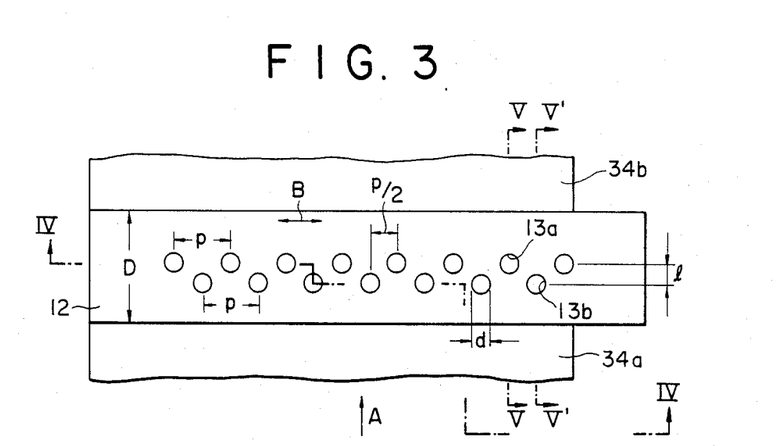
FIG. 3 is a plan view diagrammatically showing another embodiment of the overflow nozzle member.
Figure 4:
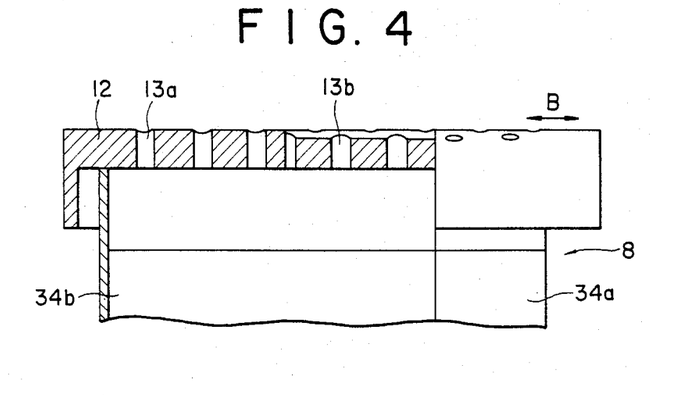
FIG. 4 is a cross-sectional view taken on line IV—IV of FIG. 3.
Figure 5A:
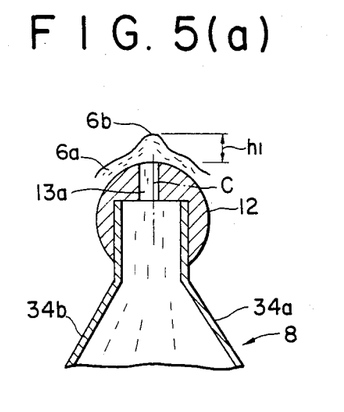
FIG. 5(a) is a cross-sectional view taken on line V—V of FIG. 3.
Figure 5B:
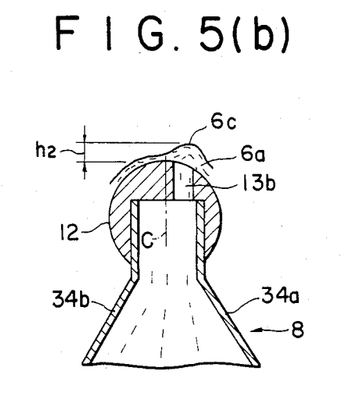
FIG. 5(b) is a cross-sectional view taken on line V'—V' of FIG. 3.

FIGS. 3 through 5 show an alternate embodiment of the cylindrical nozzle member 12 of FIGS. 1 and 2, in which the same components are designated by similar reference numerals. The nozzle member 12 in this embodiment has first and second parallel arrays of equally spaced apart overflowing ports 13a and 13b arranged such that the distance between each two adjacent ports 13a and 13b is the same.

The overflowing ports 13a of the first array are provided at positions close to and on the left hand side, as viewed in FIG. 5(a), of the vertical plane C passing the axis of the cylindrical nozzle member 12, while the ports 13b of the second array are on the right hand side, as viewed in FIG. 5(b), of the plane C. As a consequence of this arrangement, the apex 6b of each of the protruded portions of the progressive wave 6a formed above the ports 13a is positioned at a higher level than the apex 6c of each protrusion formed above the ports 13b ($h_1 > h_2$). The most preferable positional relationship between the first and second arrays of the ports 13a and 13b is such that the plane osculating both the protrusions 6b and 6c is inclined by an angle $\theta$, namely in parallel with the transfer path of the printed circuit board 1.

In particular, the preferred nozzle member 12 is such that the diameter D of the nozzle member 12 is in the range of between 40 and 60 mm, the diameter d of the ports 13a and 13b is in the range of between 5 and 10 mm, the distance p between the adjacent ports in each array is in the range of between 20 and 30 mm and the distance l between the first and second arrays is in the range of between 10 and 14 mm. The use of the nozzle member of FIGS. 3 through 5 assures more perfect soldering in comparison with that of FIGS. 1 and 2.

Figure 6:
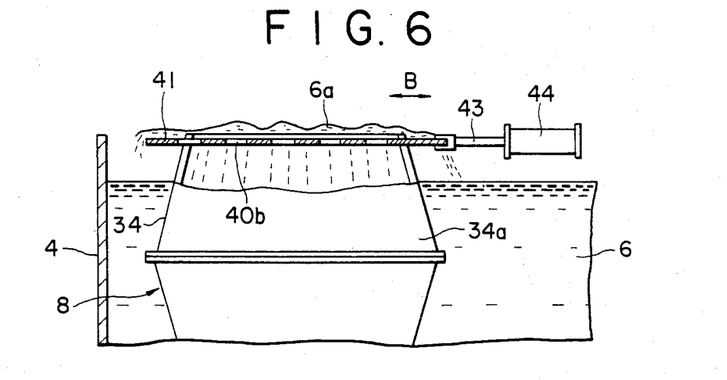
FIG. 6 is a partial, vertical, cross-sectional view diagrammatically showing another example of the solder applicator.
Figure 7:
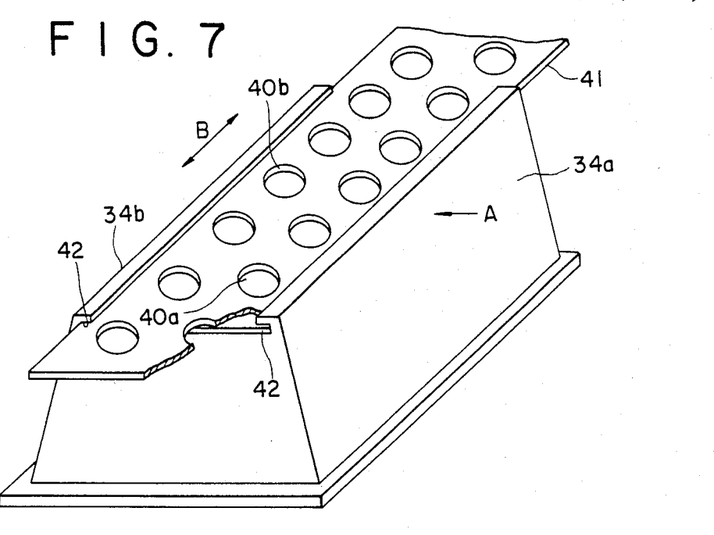
FIG. 7 is an enlarged, perspective view diagrammatically showing the overflow nozzle member of FIG. 6.

FIGS. 6 and 7 show an alternate embodiment of the first solder applicator 8, in which the same components are designated by similar reference numerals. Indicated as 41 is a laterally elongated plate provided with first and second parallel arrays of a plurality of equally spaced apart overflowing ports 40a and 40b arranged along the longitudinal axis of the plate, i.e. in a direction transverse to the transfer path of the printed circuit board 1. The plate 41 is slidably received by a pair of guide grooves 42 formed at the upper end of a riser 34 of the first solder applicator 8. One end of the plate 41 is fixedly connected with an operation rod 43 of an air cylinder 44 so that upon repeated operation of the air cylinder 44, the plate 41 is reciprocally moved along its longitudinal axis, as shown by the arrow B. Therefore, the molten solder forced to overflow from the transversely displacing ports 40a and 40b forms thereover a progressive wave 6a of the molten solder progressing in the same direction.

Figures 8, 9:
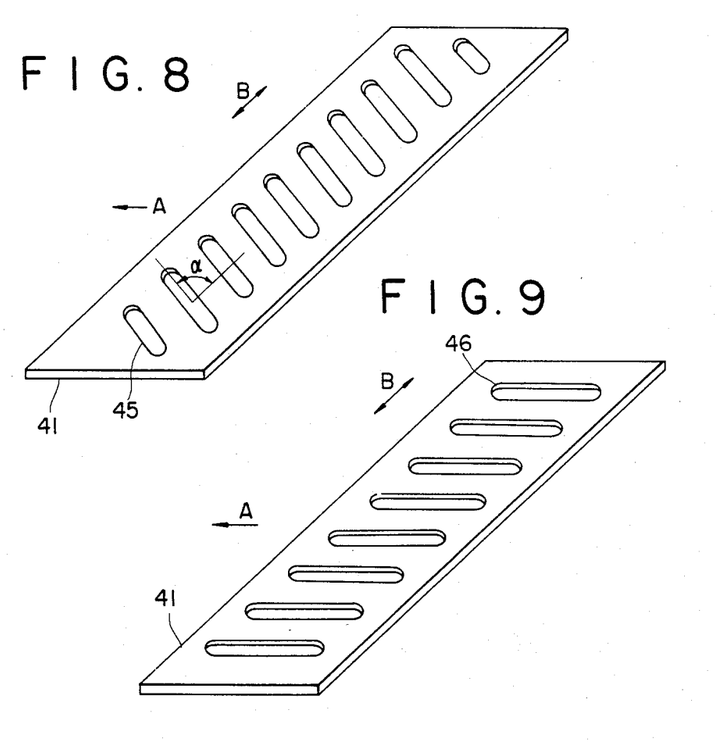
FIGS. 8 and 9 are perspective views diagrammatically showing further alternate embodiments of the top moveable plate.

The plate 41 may be formed with only a single array of the overflowing ports arranged in the same manner as the ports 40a or 40b. Further, the shape of the overflowing ports may not be specifically limited. As shown in FIGS. 8 and 9, the ports may be shaped into elongated parallel aperture 45 (FIG. 8) or 46 (FIG. 9) The longitudinal axis of each aperture 45 is oriented at an angle $\alpha$ (generally greater than 45° but not greater than 135°) with respect to a line parallel with the direction of the movement of the plate 41. The angle $\alpha$ is 90° in the case of FIG. 9, namely the longitudinal axis of the aperture 46 is substantially in parallel with the direction of the transfer path of the printed circuit board 1.

Figure 10:
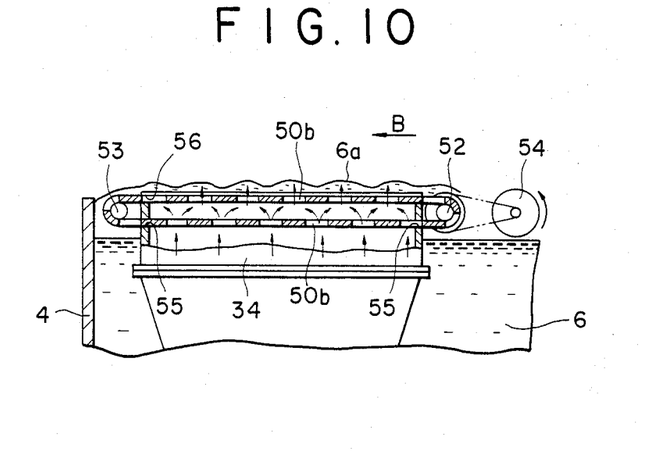
FIG. 10 is a partial, vertical, cross-sectional view, similar to FIG. 6, showing a further embodiment of the solder applicator.
Figure 11:
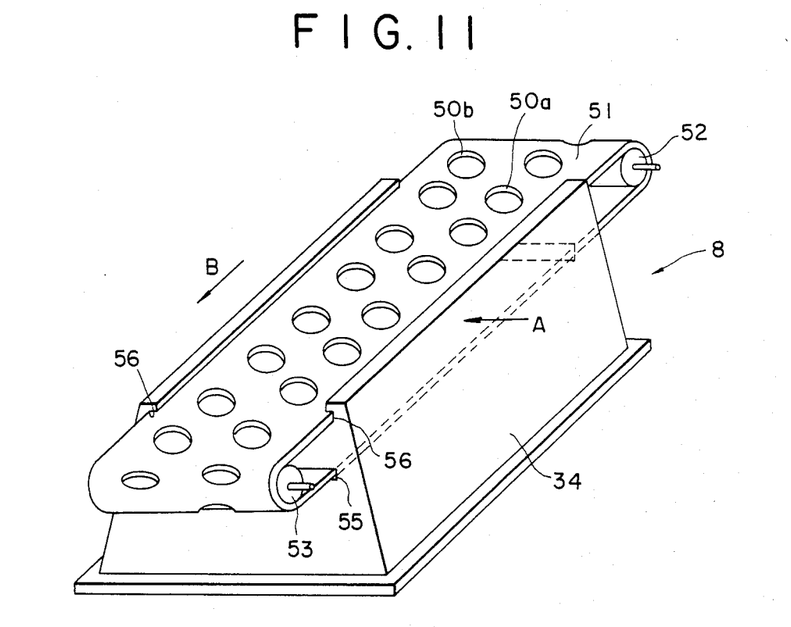
FIG. 11 is an enlarged, perspective view, similar to FIG. 7, showing the overflow nozzle member of FIG. 10.

Shown in FIGS. 10 and 11 is a further alternate embodiment of the first solder applicator 8. Rather than the reciprocal movement of the overflowing ports 13 in a direction parallel with the direction of the orientation thereof, the overflowing ports 50 of this embodiment move in one direction which is transverse to the transfer path of the printed circuit board 1 to form thereover a progressive wave of molten solder running in that direction. An endless belt 51 formed of a heat-resistant flexible material is provided at the top of a riser 34 and tensely supported between a pair of parallel drive and idler rollers 52 and 53. The drive roller 52 has a sprocket operatively connected by means of a chain with a drive shaft of a motor 54 so that upon actuation of the motor 54 in one direction, the rollers 52 and 53 are rotated with the belt 51 running in one direction while being slidably received by guide grooves 56 formed in opposite upper ends of the riser 34. Indicated as 55 are slits formed at the side plates of the riser 34 for the passage of the belt 51 therethrough. The belt 51 is provided with two arrays of overflowing ports 50a and 50b arranged in a direction parallel with the running direction B of the belt 52. Thus, the molten solder ascending within the riser 34 passes through and overflows from the overflowing ports 50a and 50b to form the progressive wave 6a progressing in the running direction B of the belt 51. In this embodiment, too, the overflowing ports 50a and 50b may be in any other shapes, such as shown in FIGS. 8 and 9, than circular shape. Further, the ports 50a and 50b may be arranged in only a single array or three or more arrays, if desired.

Figure 12:
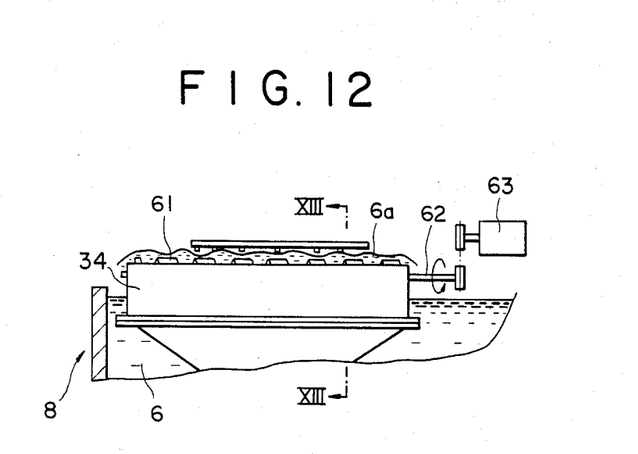
FIG. 12 is a partial, vertical, cross-sectional view, similar to FIG. 6, showing a further embodiment of the solder applicator.
Figure 13:
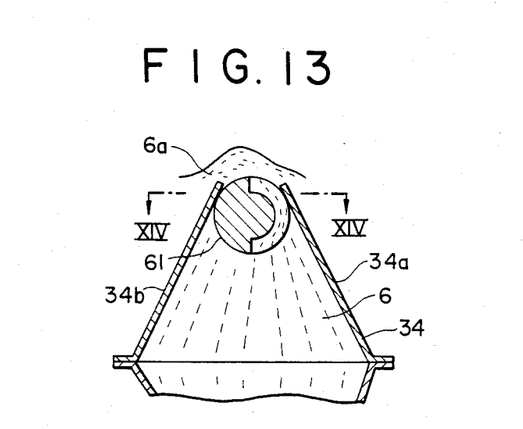
FIG. 13 is a cross-sectional view taken on line XIII—XIII of FIG. 12.
Figure 14:
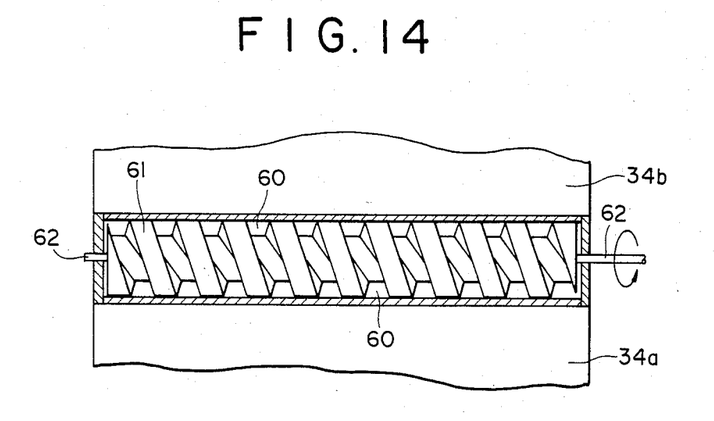
FIG. 14 is a cross-sectional view taken on line XIV—XIV of FIG. 13.

FIGS. 12 through 14 show a still further embodiment of the solder applicator 8 in which the progressive wave 6a of molten solder is formed by rotation of a worm 61 rotatably provided in the upper end, rectangular opening of the riser 34. As seen from FIG. 14, a plurality of overflowing ports 60 are defined between the worm 61 and the front and rear walls 34a and 34b of the riser 34 so that the molten solder 6 ascending within the riser 34 may overflow from the ports 60 to form, when the worm 61 is in a stationary state, a standing wave with a plurality of projected portions over the ports 60. The axis 62 of the worm which is rotatably received by the side walls of the riser 34 is connected to a drive means including a motor 63. Upon actuation of the motor 63, the worm 61 rotates about its axis 62 so that the wave of the overflowing molten solder progresses in a direction parallel with the axis 62 leftward or rightward, as viewed in FIG. 14, according to the direction of the rotation of the worm 61, i.e. the motor 63.

Figure 15:
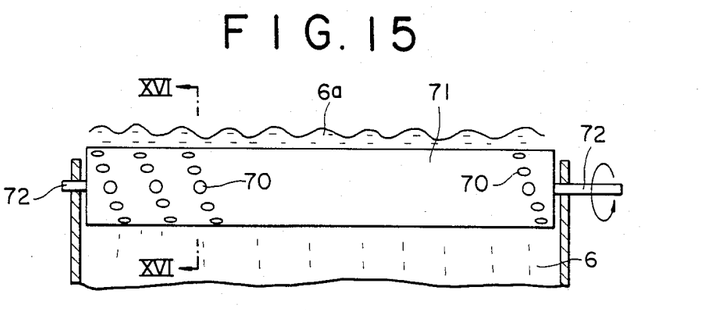
FIG. 15 is a vertical, cross-sectional view diagrammatically showing an alternate embodiment of the solder overflowing nozzle.
Figure 16:
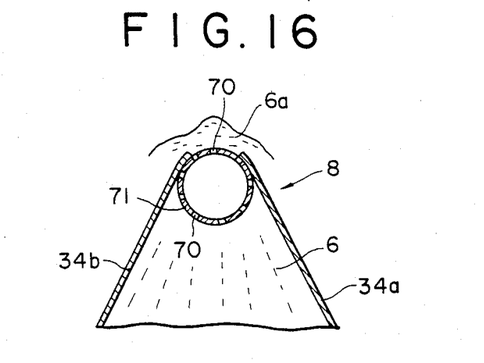
FIG. 16 is a cross-sectional view taken on line XVI—XVI of FIG. 15.

FIGS. 15 and 16 illustrate a further embodiment of the solder applicator 8 wherein the worm 61 of FIGS. 12 through 14 is replaced with a hollow cylinder 71 having a multiplicity of overflowing ports 70 arranged in a spiral fashion with the axis of the hollow cylinder as the axis of the spiral. The cylinder 71 has its shaft 72 rotatably supported by the side walls of the riser 34 and connected to any suitable drive means (not shown). Thus, the rotation of the cylinder 71 about its axis 72 causes the wave of the overlowing solder to advance in a direction parallel with the axis 72 in the same manner as that in the embodiment of FIGS. 12 through 14.

Figure 17:
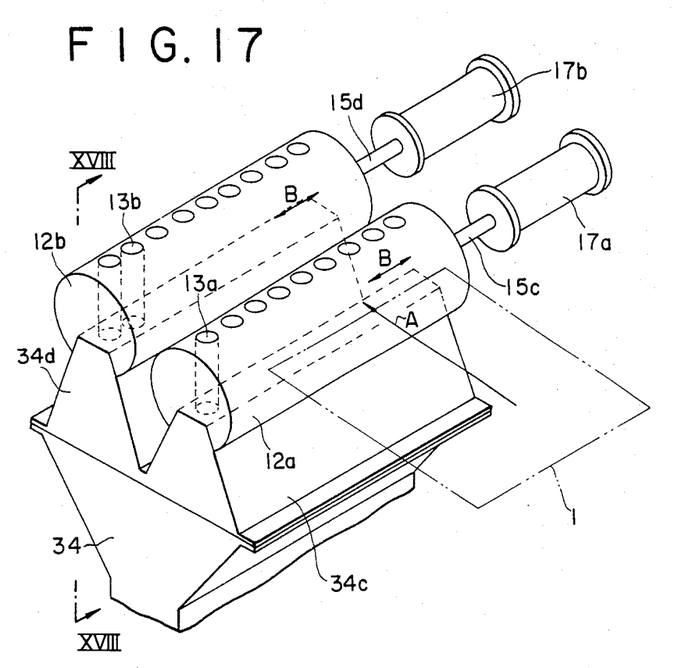
FIG. 17 is a perspective view diagrammatically showing a further embodiment of the solder overflow nozzle.
Figure 18:
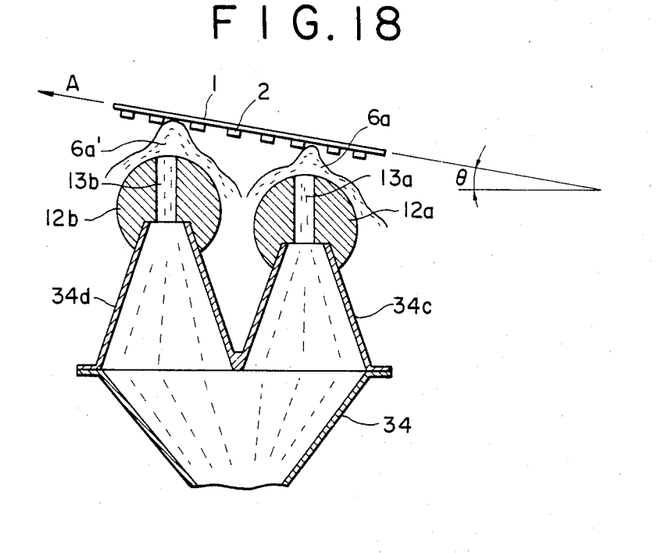
FIG. 18 is a cross-sectional view taken on line XVIII—XVIII of FIG. 17.

FIGS. 17 and 18 show a modification of the embodiment of FIG. 1. In this embodiment, the riser 34 branches at its middle portion to form two juxtaposed, parallel and laterally extending sub-risers 34c and 34d. The sub-risers 34c and 34d have their upper ends provided with slidable cylindrical nozzle members 12a and 12b, respectively, in the same manner as that of FIG. 1. The nozzle members 12a and 12b have a plurality of overflowing ports 13a and 13b, respectively, which are arranged in a direction in parallel with the axes of the cylindrical nozzle members 12a and 12b and which are in fluid communication with the riser 34. To one ends of the nozzle members 12a and 12b are connected operating rods 15c and 15d of air cylinders 17a and 17b, respectively, so that the nozzle members 12a and 12b are reciprocally moved in the direction of the arrow B, i.e. in parallel with the axes of the nozzle members 12a and 12b when the air cylinders 17a and 17b are operated, whereby the molten solder overflowing from the nozzle members 12a and 12b forms thereover progressive waves 6a and 6a' each moving in the direction B. It is preferred that the nozzle members 12a and 12b be arranged so that the plane osculating with both the protrusions of the progressive waves 6a and 6a' is inclined by an angle $\theta$, as shown in FIG. 18, namely in parallel with the transfer path A of the printed circuit board 1.

Figure 19:
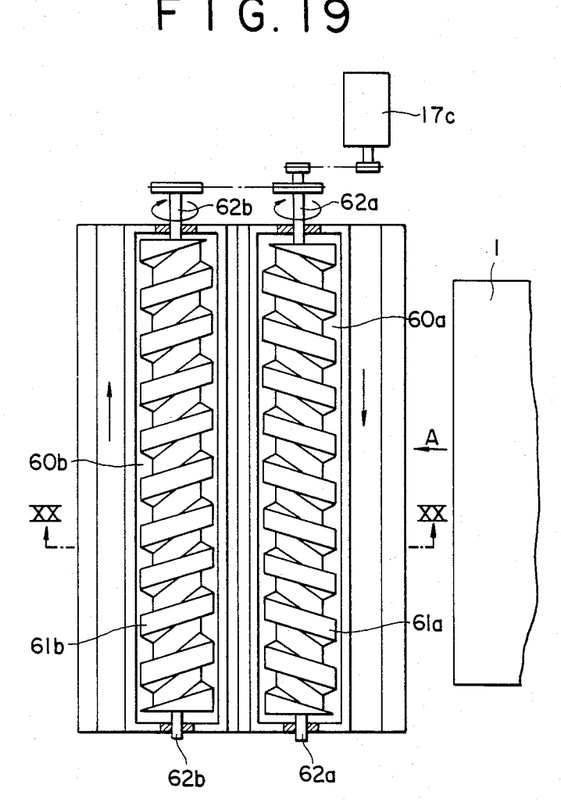
FIG. 19 is a plan view diagrammatically showing a further embodiment of the solder overflow nozzle.
Figure 20:
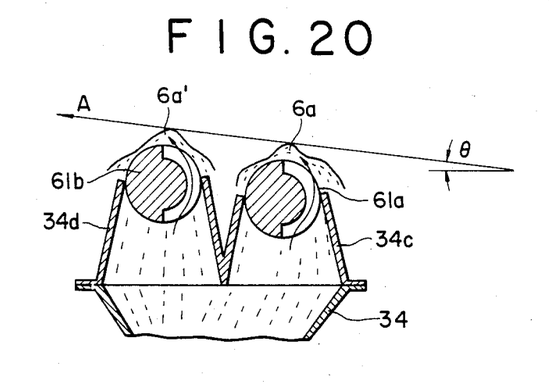
FIG. 20 is a cross-sectional view taken on line XX—XX of FIG. 19.

FIGS. 19 and 20 show an alternate embodiment of FIGS. 17 and 18, in which the nozzle members 12a and 12b of FIGS. 17 and 18 are replaced with worms 61a and 61b each having a structure and function similar to that shown in FIG. 14. The worms 61a and 62b have their shafts 62a and 62b rotatably supported by side walls of the riser 34 and operatively connected to a motor 17c. When the motor 17c is powered, the worms 62a and 62b are simultaneously rotated so that the waves 6a and 6a' formed over the worms 62a and 62b, respectively, are moved in parallel with their rotational axes and in directions opposite to each other. If desired, the progressing directions of the waves 6a and 6a' may be the same with each other. As described previously with reference to the embodiments shown in FIGS. 5(a) and 5(b) and in FIG. 18, it is preferred that the level of the apex of the wave 6a' be higher than that of the wave 6a so that the plane osculating with the top surfaces of the waves 6a and 6a' may be inclined by an angle $\theta$ likewise in the embodiments shown in FIGS. 5(a) and 5(b) and FIG. 18. The level of the top surfaces of the waves 6a and 6a' in this embodiment (and in the case of the embodiments of FIGS. 5(a) and 5(b) and FIG. 18, too) can be changed by any known way, for example by varying the diameters or cross-sectional areas of the overflowing ports or by inclining the orientation of the overflowing ports.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

I claim:

1. In an apparatus for soldering printed circuit board moving along a predetermined transfer path, which comprises a vessel for containing a molten solder, an upwardly extending riser having its lower end in flow communication with the vessel, and feed means operable for supplying the molten solder within the vessel to overflow from the upper open end of the riser, with the underside surface of the printed circuit board being contacted with the overflowing molten solder, the improvement comprising: said riser being provided at its upper open end with a plurality of molten solder-overflowing ports arranged transversely to said transfer path so that the molten solder overflowing therefrom may form a transversely oriented standing wave having a plurality of protruded surfaces over respective overflowing ports, said overflowing ports being moveable such that said standing wave may progress in a direction transverse to said transfer path, whereby the underside surface of the printed circuit board is contacted with the progressive wave of molten solder overflowing from the moving overflowing ports.

2. The apparatus as set forth in claim 1, wherein said molten solder-overflowing ports are through holes formed in a cylindrical nozzle member and arranged in a row, said nozzle member being slidably mounted on the upper open end of said riser and moveable in a direction in parallel with the orientation of said row.

3. The apparatus as set forth in claim 1, wherein said molten solder-overflowing ports are through holes formed in a cylindrical nozzle member and arranged in parallel first and second arrays, said nozzle member being slidably mounted on the upper open end of said riser and moveable in a direction in parallel with the orientation of the first and second arrays.

4. The apparatus as set forth in claim 3, wherein said first and second arrays of the through holes are arranged so that the apex of the protruded surface of said progressive wave over said first array is positioned at a lower level than that of said second array which is located downstream along the transfer path of said first array.

5. The apparatus as set forth in claim 4, wherein said through holes are arranged in a zig-zag fashion.

6. The apparatus as set forth in claim 1, wherein said molten solder-overflowing ports are perforations formed in a plate member slidably mounted on the upper open end of said riser and moveable in a direction in parallel with the orientation of the perforations.

7. The apparatus as set forth in claim 6, wherein said perforations are arranged in two parallel arrays.

8. The apparatus as set forth in claim 6, wherein said perforations are arranged in a row and each being in the form of an elongated aperture with its longitudinal axis being oriented at an angle of between 45° and 135° with respect to the line which is perpendicular to the direction of the movement of the printed circuit board.

9. The apparatus as set forth in claim 1, wherein said molten solder-overflowing ports are perforations formed in an endless belt member slidably mounted on the upper open end of said riser and moveable in a direction in parallel with the orientation of the perforations.

10. The apparatus as set forth in claim 1, wherein said perforations are arranged in two parallel arrays.

11. The apparatus as set forth in claim 10, wherein said perforations are arranged in a row and each being in the form of an elongated aperture with its longitudinal axis being oriented at an angle of between 45° and 135° with respect to the line which is perpendicular to the direction of the movement of the printed circuit board.

12. The apparatus as set forth in claim 1, wherein said molten solder-overflowing ports are openings defined between a worm and the upper end aperture of said riser within which said worm is rotatably mounted, said worm being rotatable so that said openings may be displaced in an axial direction of said worm.

13. The apparatus as set forth in claim 1, wherein said molten solder-overflowing ports are a multiplicity of perforations formed in a hollow cylinder in a spiral fashion, said hollow cylinder being mounted within the upper open end of said riser and rotatable about its axis.

14. The apparatus as set forth in claim 1, wherein said riser is divided into two parts having respective upper open ends provided with first and second cylindrical nozzle members extending in parallel with each other and in directions transverse to said transfer path and slidably moveable in directions in parallel with their respective axes, and said molten solder-overflowing ports are through holes formed in each of said first and second nozzle members.

15. The apparatus as set forth in claim 14, wherein the through holes of the first and second nozzle members are arranged so that the apex of the protruded surface of the progressive wave formed over said first nozzle member board is positioned at a lower level than that over said second nozzle member which is located downstream along the transfer path of said first nozzle member.

16. The apparatus as set forth in claim 1, wherein said riser is divided into two parts having respective upper open apertures provided with first and second worms extending in parallel with each other and in directions transverse to said transfer path, and said molten solder-overflowing ports are openings defined between each worm and the upper end aperture within which said worm is mounted, said first and second worms being rotatable about their axes so that said openings may be displaced in an axial direction of each worm.

17. The apparatus as set forth in claim 16, wherein the openings are arranged so that the apex of the protruded surface of the progressive wave formed over said first worm is positioned at a lower level than that over said second worm which is located downstream along the transfer path of said first worm.

18. The apparatus as set forth in claim 1, further comprising means for applying a second molten solder contained in a second vessel to the printed circuit board which has been subjected to the soldering treatment by contact with said progressive wave.

* * * * *